(12) United States Patent
Fisher (10) Patent No.: US 7,856,753 B2
(45) Date of Patent: Dec. 28, 2010

(54) EASILY DISASSEMBLED NAVEL ORANGEWORM EGG TRAP APPARATUS

(75) Inventor: Joan Fisher, Bend, OR (US)

(73) Assignee: Suterra LLC, Los Angles, CA (US)

( * ) Notice: Subject to any disclaimer, the term of this patent is extended or adjusted under 35 U.S.C. 154(b) by 0 days.

(21) Appl. No.: 12/342,611

(22) Filed: Dec. 23, 2008

(65) Prior Publication Data

US 2010/0154289 A1   Jun. 24, 2010

(51) Int. Cl.
*A01M 1/02* (2006.01)
*A01M 1/10* (2006.01)

(52) U.S. Cl. .......................... 43/122; 43/107; 43/132.1
(58) Field of Classification Search ................ 43/107, 43/121, 122, 124, 131, 132.1
See application file for complete search history.

(56) References Cited

U.S. PATENT DOCUMENTS

| | | | | |
|---|---|---|---|---|
| 3,855,727 | A * | 12/1974 | Canoy | 43/65 |
| 4,782,622 | A * | 11/1988 | Roberts | 43/131 |
| 4,813,174 | A | 3/1989 | Cook | |
| 4,884,361 | A | 12/1989 | Sonenshine et al. | |
| D306,061 | S * | 2/1990 | Cutter | D22/122 |
| 4,908,977 | A | 3/1990 | Foster | |
| 4,992,268 | A | 2/1991 | Landolt et al. | |
| 5,150,541 | A | 9/1992 | Foster et al. | |
| 5,557,880 | A * | 9/1996 | Schneidmiller | 43/122 |
| 5,617,669 | A * | 4/1997 | Levey | 43/44.99 |
| 5,775,026 | A | 7/1998 | Pearce et al. | |
| 5,915,948 | A | 6/1999 | Kunze et al. | |
| 5,939,062 | A | 8/1999 | Heath et al. | |
| 6,016,625 | A * | 1/2000 | Bishoff et al. | 43/121 |
| 6,378,243 | B1 * | 4/2002 | Snell et al. | 43/131 |
| 6,393,760 | B1 | 5/2002 | Lingren | |
| 6,502,348 | B2 | 1/2003 | Bernard | |
| 6,543,182 | B2 * | 4/2003 | Snell et al. | 43/132.1 |
| 6,546,668 | B1 * | 4/2003 | Ball et al. | 43/131 |
| 6,625,922 | B1 * | 9/2003 | Ernsberger, IV | 43/122 |
| 6,718,687 | B2 * | 4/2004 | Robison | 43/114 |
| 6,792,713 | B2 | 9/2004 | Snell et al. | |
| 7,503,141 | B1 * | 3/2009 | Leeman | 43/44.99 |

OTHER PUBLICATIONS

L.P.S. (Bas) Kuenen, et al., Bait Formulations and Longevity of Navel Orangeworm Egg Traps Tested, Bait Formulations Cal. Agric., vol. 62, No. 1, p. 36, 2008.

(Continued)

*Primary Examiner*—David J Parsley
(74) *Attorney, Agent, or Firm*—Cotman IP Law Group, PLC (57) ABSTRACT

An easily disassembled navel orangeworm egg trap apparatus which facilitates easy cleaning, inspection, maintenance, reloading, and repair. One or more embodiments of the invention enable orchard workers in the field to easily disassemble a navel orangeworm egg trap for cleaning, inspection, and repair. In one or more embodiments of the invention, at least one chamber section that is detachably coupled along the length of the chamber section. The chamber disassembles along the length of the chamber sections, thus exposing the inner surfaces of the ovipositional bait attractant chamber. By offering an easily disassembled chamber that exposes the inner surface, navel orangeworm egg traps are easily cleaned and repaired in the field.

20 Claims, 6 Drawing Sheets

OTHER PUBLICATIONS

Van Steenwykm et al., Improved NOW Egg Traps, California Agriculture 40(1):24-25. DOI: 10.3733/ca.v040n01p24. Jan.-Feb. 1986.

Weinzierl, R., et al., Insect Attractants and Traps, Alternatives in Insect Management, ENY-277, Jun. 1995.

Professional Pest Control Products, Fruit Fly Control, Do It Yourself Pest Control, pestproducts.com, Feb. 2009.

Barry, JD, et al., Evaluation of traps and toxicants in an attract-and-kill system for *Rhagoletis mandax* (Diptera: Tephritidae), 1: J Econ Entomel Dec. 2004 97(6): 2006-14.

* cited by examiner

EASILY DISASSEMBLED NAVEL ORANGEWORM EGG TRAP APPARATUS

BACKGROUND OF THE INVENTION

1. Field of the Invention

Embodiments of the invention described herein pertain to the field of pest management and the monitoring of pest populations. More particularly, but not by way of limitation, one or more embodiments of the invention enable an easily disassembled navel orangeworm egg trap to facilitate cleaning, inspection, maintenance, reloading, and repair.

2. Description of the Related Art

Navel orangeworm are the primary pest of pistachios and almonds and are a serious pest of walnuts. The larvae and pupae of navel orangeworm overwinter in old nuts left on the trees or on the ground after harvesting. The adults emerge in the spring, and the female adults lay their eggs on the nuts remaining on the trees or on twigs close to the old nuts. When the eggs hatch, the larvae of the navel orangeworm crawl to the inside of the nut and dig into the kernel of the nut. Navel orangeworm causes damage by feeding on nut kernels and increase processing costs.

Monitoring the population of navel orangeworm is a critical part of a pest management program. Accurate predictions of navel orangeworm populations are necessary for timing insecticide sprays to maximize the control of the larvae. Accurate timing is particularly important for modern insecticides which are effective for shorter periods of time.

The navel orangeworm egg trap is the primary tool nut growers use to monitor and control navel orangeworm populations. A conventional navel orangeworm egg trap typically is a narrow plastic vial with screened vents near the center of the vial. The vial is filled with an ovipositional bait attractant which draws the female navel orangeworm. Two end-caps attach to the ends of the plastic vial to seal the contents of the vial.

Orchard workers place the navel orangeworm egg traps on tree branches throughout an orchard. Volatile compounds from the ovipositional bait attractant escapes through the vents of the egg traps, which lures the female navel orangeworm to the egg traps. The female navel orangeworm lay their eggs on the grooved sections of the trap. Workers routinely examine the egg traps and count and record the number of eggs laid on each egg trap. Workers then remove the eggs from each egg trap and return the egg traps to the tree branches. The egg count information is analyzed over time to provide growers with an estimation of the total navel orangeworm population in the orchard. Alternatively, workers can monitor the development of the eggs laid on the trap. This population information enables growers to accurately manage pest control activities such as determining the time to apply insecticides.

One drawback of the commercially available traps is that they may be difficult to inspect, clean, and repair. Periodically, workers in the field are required to replace the attractant material and clean the navel orangeworm trap. Workers may remove the two end-caps from the trap, and then push the remaining attractant out of the trap. Inspection of the egg trap may be rendered difficult as the narrowness of the vial provides the workers with only an oblique view of the inner surfaces of the trap. Cleaning may be problematic as damage to the screens may result if workers attempt to aggressively clean the egg trap. Repair to the screens may also be difficult as workers are unable to directly access the inner surfaces of the trap. This inability to clearly see and directly access the inner surfaces of the vials may make inspection, cleaning, and repair problematic and time consuming.

For at least the limitations described above, there is a need for a navel orangeworm egg trap that easily disassembles for easy inspection, cleaning and repair.

BRIEF SUMMARY OF THE INVENTION

One or more embodiments of the invention enable an easily disassembled navel orangeworm egg trap. One or more embodiments of the invention enable orchard workers in the field to easily disassemble, clean, refill the ovipositional bait attractant, and reassemble navel orangeworm egg traps. In one or more embodiments of the invention, the navel orangeworm egg trap may have two half-tubular sections that have a half-circle cross section. The two half-tubular sections may attach to each other through the use of multiple pins and blind-holes. Ovipositional bait attractant material that lures female navel orangeworms to lay their eggs on the egg trap may be placed within the attached half-tubular sections. The half-tubular sections may have multiple vents that allow the volatile compounds of the bait attractant to be released into the surrounding air. The outer surfaces of the half-tubular sections may have grooves to replicate the topography of a splitting hull or nut shell that encourages the female navel orangeworm to lay her eggs on this surface. The top and bottom of the connected half-tubular sections are enclosed with two end-caps that seal the attractant material inside the trap. The top end-cap may be attached to a hanger that allows the navel orangeworm egg trap to be hung from a tree branch in an orchard. Egg traps may be examined periodically for the number of eggs laid on the grooved surfaces and the development stages of the eggs to determine the overall population and development stages of navel orangeworm in the orchard and to accurately time the application of insecticides.

In one or more sections of a chamber may be detachably coupled to form a chamber that holds an attractant but allows the volatile compounds of the attractant to permeate the environment where the trees are grown. These sections of the chamber may disassemble to expose the inner surfaces of the chamber for easy cleaning, inspection, and repair. In one or more embodiments of the invention, the outer surfaces of the chamber may have a surface topography on which female navel orangeworm may lay their eggs.

In one or more embodiments of the invention, a plurality of chamber sections may be detachably connected along a longitudinal axis to form a trap chamber. A multi-dimensional surface topography may be formed on some portion of the outer surface of at least one of these chamber sections. At least one vent may be fixedly coupled to at least one of the chamber sections which permits air to pass through the chamber section. The trap chamber may be configured to contain a bait attractant. The vent allows the volatile compounds from the bait attractant to escape from the trap chamber. In one or more embodiments of the invention, a hanger may be coupled to the trap chamber so that the trap chamber may be supported by a physical structure.

In one or more embodiments of the invention, orchard workers may periodically clean the navel orangeworm egg traps and place new attractant into the egg traps. A worker may remove the egg trap from the tree, and may disassemble the two end-caps from the chamber of the trap. The chamber may further disassemble into the two chamber sections. The worker may remove the attractant from the chamber sections and clean the exposed inner surfaces of the chamber sections with a brush. The worker may be able to inspect the vents, the screening materials, and the entire inner surface of the chamber sections.

In one or more embodiments of the invention, workers may be able to repair the egg traps. Workers may be able to replace the screening material, reattach the screening material, repair the means through which the chamber section are detachably coupled, and repair damage to the integrity of the egg trap.

In one or more embodiments of the invention, the chamber may have more than two chamber sections. In one or more embodiments of the invention, the chamber sections may be of any shape. In one or more embodiments of the invention, the chamber sections may be coupled to the other chamber sections with hinges that enable the chamber sections to disassemble and lay flat for easy cleaning and re-assembly.

In one or more embodiments of the invention, the multiple chamber sections may be formed out of a single piece of semi-flexible material. Workers may be able to open up the chambers by bending back one chamber section with respect to another. After cleaning and inspection, the workers may close the chamber sections back onto the adjacent chamber sections. In one or more embodiments of the invention, the chambers may be made of plastic or soft metals.

In one or more embodiments of the invention, the vents may be formed by a series of small holes or perforations in the chamber sections that are sufficiently small to prevent the solid attractant from escaping from the trap. The vents may be formed by holes upon which a meshed screening material is secured. The screening material may be made out of wire-mesh, polyester screening, or any other material that enables volatile compounds to escape to the surrounding environment.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

An easily disassembled navel orangeworm egg trap will now be described. In the following exemplary description, numerous specific details are set forth in order to provide a more thorough understanding of embodiments of the invention. It will be apparent, however, to an artisan of ordinary skill, that the present invention may be practiced without incorporating all aspects of the specific details described herein. In other instances, specific features, quantities, or measurements well known to those of ordinary skill in the art have not been described in detail so as not to obscure the invention. Readers should note that, although examples of the invention are set forth herein, the claims, and the full scope of any equivalents, are what define the metes and bounds of the invention.

Figure 1:
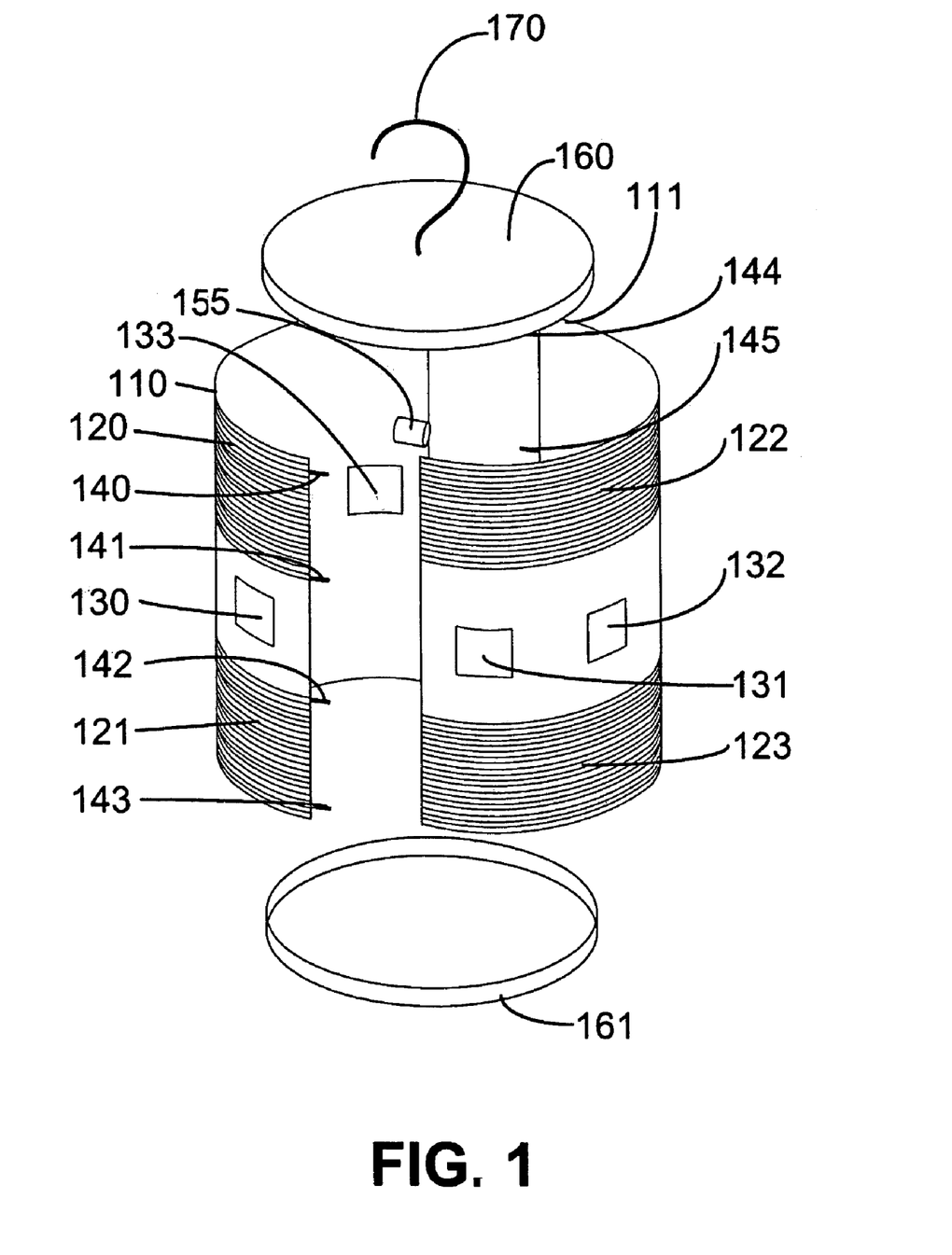
FIG. 1 presents an exploded view of an embodiment of the invention.
Figure 2:
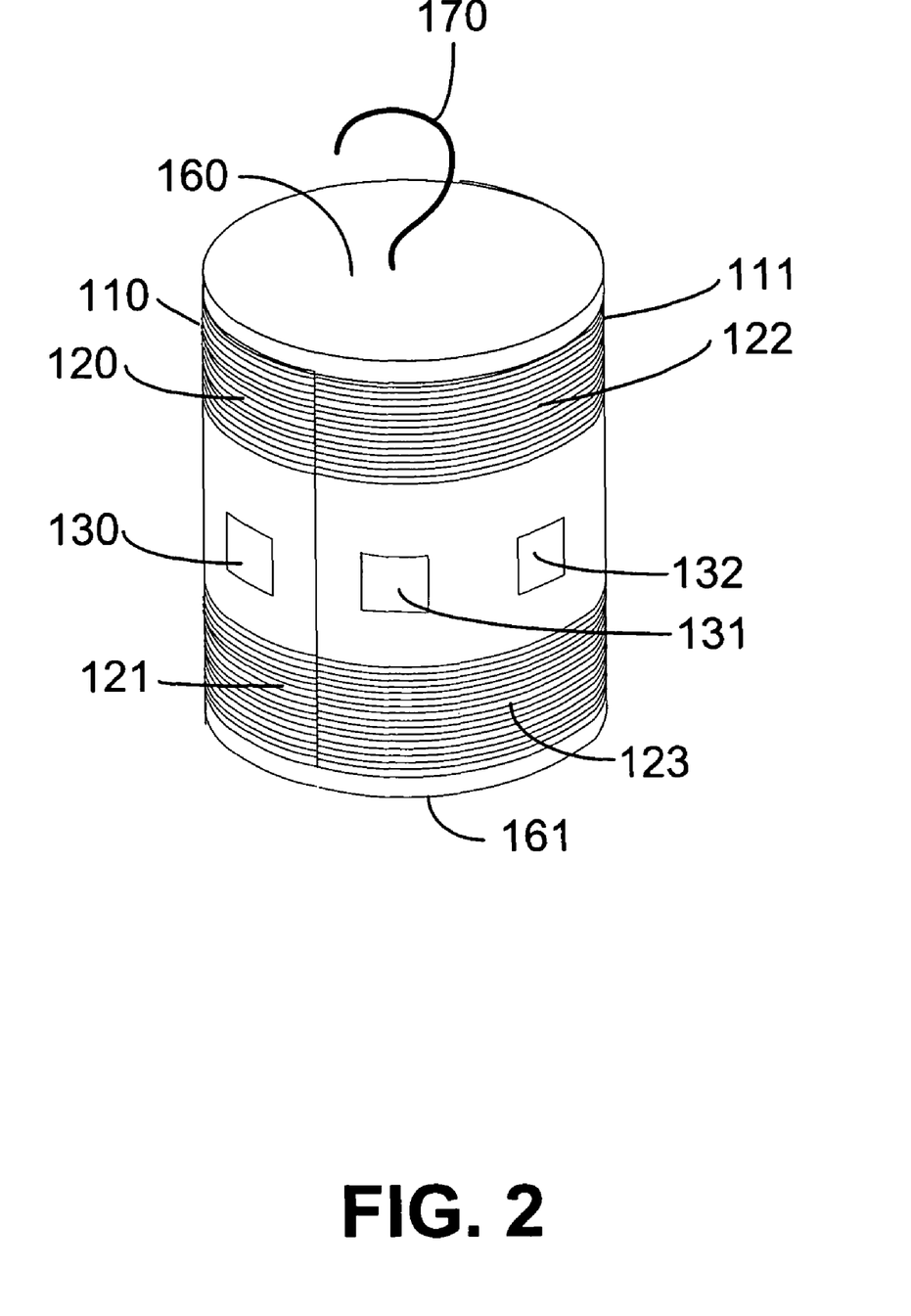
FIG. 2 presents a view of an embodiment of the invention that is fully assembled.

FIG. 1 presents an exploded view of an embodiment of the navel orangeworm egg trap apparatus, while FIG. 2 presents a view of one or more embodiments of the assembled egg trap. In one or more embodiments of the invention, an ovipositional bait attractant is placed within the inner volume of the chamber formed by first half tubular section 110, second half tubular section 111, top end-cap 160, and bottom end-cap 161. The ovipositional bait attractant may lure female navel orangeworm to lay their eggs on the egg trap. In one or more embodiments of the invention, a first half tubular section 110 may have a plurality of vents 130 and 133. Second half tubular section 111 may have a plurality of vents 131 and 132. In one or more embodiments of the invention, vents 130, 131, 132, and 133 allow the volatile compounds of the attractant to permeate the air near where the trees are grown. Vents 130, 131, and 132 may be a series of openings that are sufficiently small to prevent the attractant from leaking out of the trap, or prevent an insect or animal from reaching or feeding on the attractant material. In one or more embodiments of the invention, a screened mesh may be secured behind or in front of the vent openings. The screening material may be made out of metal, fiber, plastic, wire, polyester screening, or any other material that enables volatile compounds to escape to the surrounding air.

The ovipositional bait attractant releases volatile odors which lure female navel orangeworms to lay their eggs on the trap hosts. Ovipositional bait attractant may consist of a meal in the form of chicken feed, ground corn, rolled oats, or ground nuts. Almond oils, almond extracts, glycerol, and other substances may be added to the meal to aid in the effectiveness of the ovipositional bait attractant.

Surface topographies 121 and 122 are formed on an outer surface of the first half tubular section 110, and surface topographies 122 and 123 may be formed on an outer surface of the second half tubular section 111. In one or more embodiments of the invention, the surface topographies 120-123 may simulate a surface where the navel orangeworm might preferably lay eggs. For example the surface topography may take the form of a crosshatch pattern or grooves that replicate a hull or shell split. In one or more embodiments of the invention, the grooves may be formed through an injection molding process, through a machining or milling process, through an etching process, through an engraving process, or through any process that results in a series of grooves on the surface. In one or more embodiments of the invention, the grooves may be nearly horizontal. In one or more embodiments of the invention, the grooves may be vertical. In one or more embodiments of the invention, one or more surfaces of the first half tubular section 110 and second half tubular section 111 and end-caps 160 and 161 may have crosshatch markings. In one or more embodiments of the invention, one or more of the end-caps 160 and 161 may have grooves or crosshatch marks on their surfaces. In one or more embodiments of the invention, the grooves or crosshatch marks are on a surface other than first half tubular section 110 and second half tubular section 111.

In one or more embodiments of the invention, the first half tubular section 111 is detachably coupled along the length or longitudinal axis to second half tubular section 111 to form a chamber. In one or more embodiments of the invention, the detachable coupling of first half tubular section 110 and second half tubular section 111 may be through the use of pins 140-143 (shown) and blind-holes 150-153 (not shown)

respectively, and pins 144 and 145 (shown) and pins 146 and 147 (not shown) with blind hole 154 (shown) and blind-holes 155-157 (not shown). First half tubular section 110 and second half tubular section 111 are detachably coupled as the blind holes 150-157 receive the pins 140-147. The diameter of the blind holes 150-157 and the pins 140-147 may be such that first half tubular section 110 and second half tubular section 111 remains coupled for the ordinary use of the egg trap but may be decoupled for cleaning, inspection, and repair. In one or more embodiments of the invention, first half tubular section 110 and second half tubular section 111 may attach using a tongue-in-groove, hinges, mechanical fasteners, tape, elastic bands, or any other attachment means that provide a detachable coupling.

In one or more embodiments of the invention, and a bottom end-cap 161 may seal a bottom end of the said chamber formed by first half tubular section 110 coupled to second half tubular section 111. In one or more embodiments of the invention, a bait attractant may be placed within the chamber formed by first half tubular section 110, second half tubular section 111, and bottom end-cap 161. Top end-cap 160 may seal the top end of said chamber formed by first half tubular section 110, second half tubular section 111, and bottom end-cap 161. The end-caps 160 and 161 may attach to the chamber formed by first half tubular section 110 and second half tubular section 111 through a compression fit, threads, tape, a mechanical fastener, an elastic band, or any other attachment method that provides for a detachable coupling.

In one or more embodiments of the invention, hanger 170 may be coupled to the top end-cap 160 which supports the chamber from a physical structure. Hanger 170 may be attached to end-cap 160 which enable the entire egg trap apparatus to be hung from tree branches or other physical structures. In one or more embodiments of the invention, the hanger may be made of plastic, metal, carbon fiber, cardboard, fiberglass, or any other durable material. In one or more embodiments of the invention, the hanger 170 and the top end-cap 160 may form a one-piece assembly. In one or more embodiments of the invention, hanger 170 and top end-cap may be formed through an injection molding process or through a machining or milling process.

In one or more embodiments of the invention, first half tubular section 110 and second half tubular section 111 and end-caps 160 and 161 may be formed in plastic, metal, carbon fiber, cardboard, fiberglass, or any other durable material. In one or more embodiments of the invention, first half tubular section 110 and second half tubular section 111 may be formed through the means of an injection molding process, a machining or milling process, or through an assembly process.

In one or more embodiments of the invention, first half tubular section 110 and second half tubular section 111, and the end-caps 160 and 161 may be painted or covered with a material that has a dark and less-reflective color. In one or more embodiments of the invention, first half tubular section 110 and second half tubular section 1, and the end-caps 160 and 161 may be formed out of a material with a dark and less-reflective material. Examples of a suitable dark color may include black, dark green, dark blue, dark brown, and dark indigo.

Figure 3:
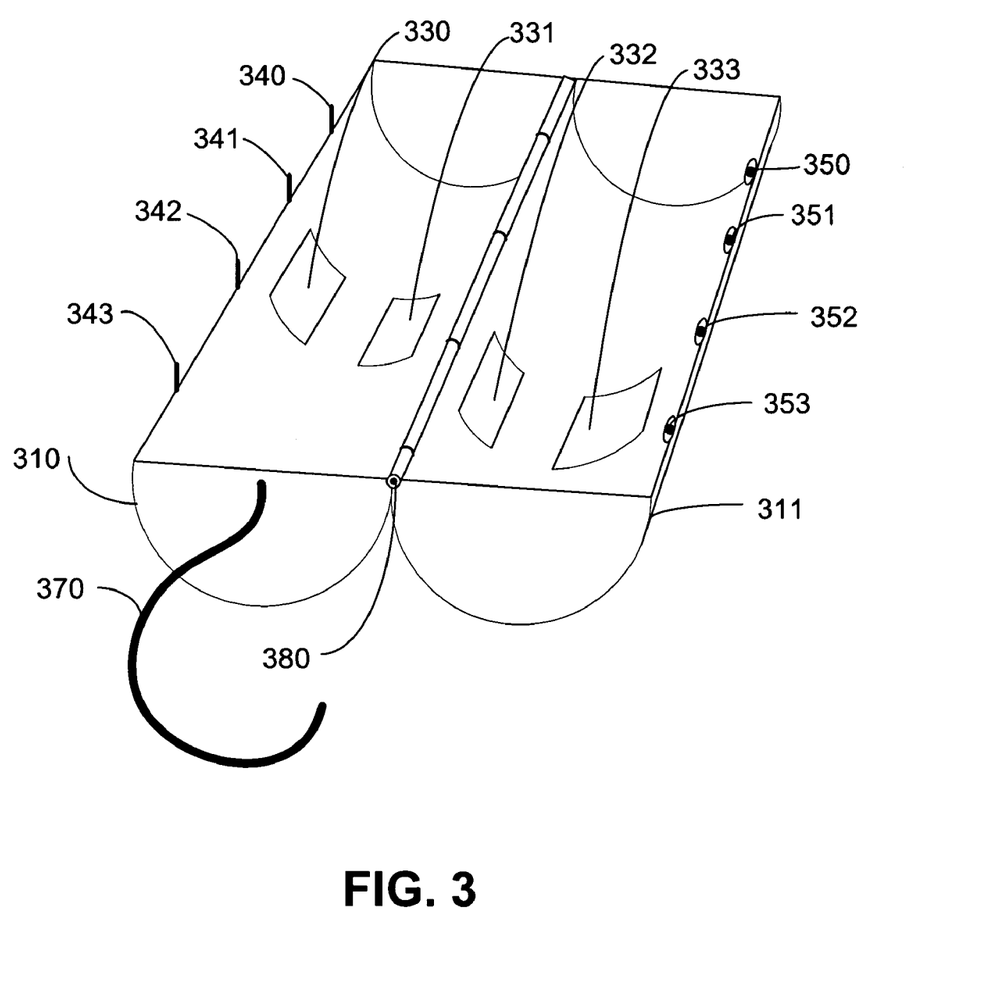
FIG. 3 presents a view of an embodiment of the invention illustrating detachable chamber sections couple using a hinge.

FIG. 3 is a view of one or more embodiments of the invention. In one or more embodiments of the invention, separate end-caps may be rendered unnecessary as chamber sections 310 and 311 are formed to include a top and bottom surface perpendicular to the length or longitudinal axis of the chamber sections 310 and 311. In one or more embodiments of the invention, a bait attractant may be placed within the inner volume of chamber sections 310 and 311. In one or more embodiments of the invention, chamber sections 310 and 311 may be formed by an injection molding process or by a machining and milling process. In one or more embodiments of the invention, hanger 370 may be coupled to chamber section 310. In one or more embodiments of the invention, hanger 370 and chamber section 310 may be one piece. In one or more embodiments of the invention, the one-piece unit of hanger 370 and chamber section 310 may be formed by an injection molding process or by a machining and milling process.

In one or more embodiments of the invention, chamber sections 310 and 311 may be coupled together with a hinge 380 that runs along the length or longitudinal axis of the chamber sections 310 and 311. The use of a hinge 380 may enable an orchard worker in the field to easily re-assemble the navel orangeworm egg trap as pins 340-343 and blind-holes 350-353 may be automatically aligned as the chamber section 310 folds over and on top of chamber section 311. In one or more embodiments of the invention, the chamber may have more than 2 chamber sections, where each chamber section is coupled to the adjacent chamber section through the use of hinges.

In one or more embodiments of the invention, a second hinge forms another detachable coupling between chamber sections 310 and 311 and replaces the detachable coupling mechanism provided by the pins 340-343 and blind-holes 350-353. In this configuration, a worker in the field may remove the pin from one of the hinges and opens up the chamber assembly about the other hinges. After cleaning and replacement of the attractant material, the worker may close the chamber sections together and replaces the pin in the hinge.

In one or more embodiments of the invention, vents 330-333 may be formed in the chamber sections 310 and 311. In one or more embodiments of the invention, vents 330-333 may be in the form of a series of small holes or perforations that allow for ventilation but otherwise contains the attractant material. In one or more embodiments of the invention, the vents may also be larger holes with a screen mesh attached to the chamber sections 310 and 311.

Figure 4:
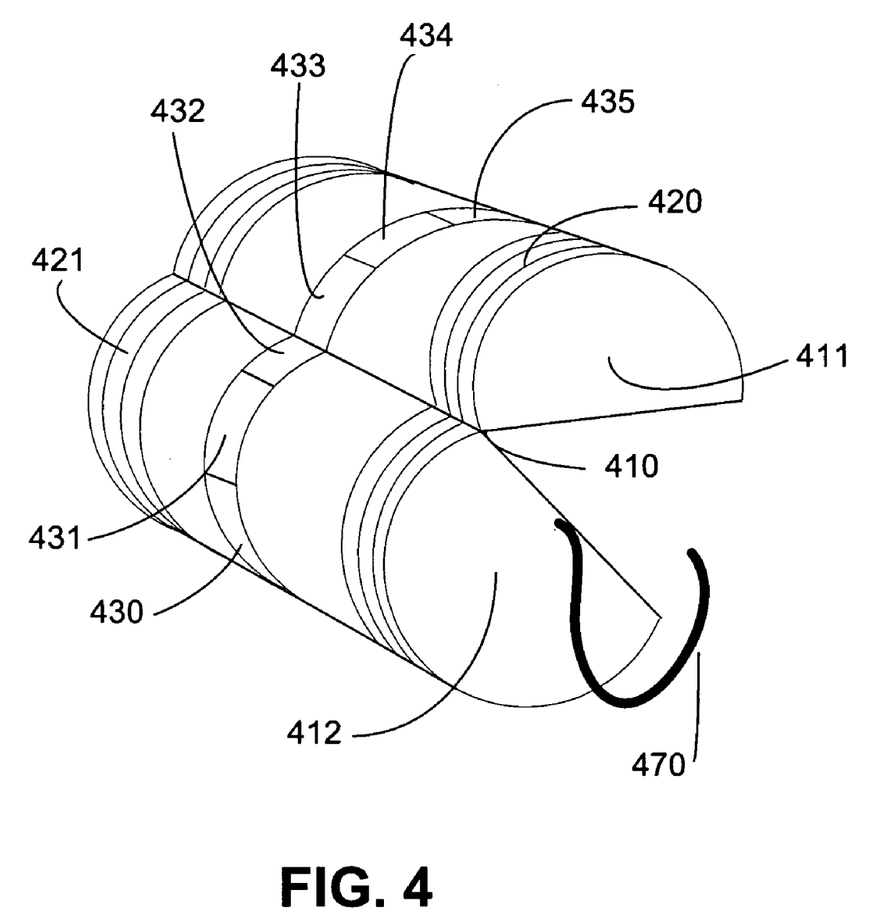
FIG. 4 presents a view of an embodiment of the invention in which the chamber sections are formed out of a single piece of material.

FIG. 4 is a view of an embodiment in which the chamber sections are formed out of a single piece. This approach potentially offers lower manufacturing costs. In one or more embodiments of the invention, chamber 410 may have an upper half-shell 411 and a lower half-shell 412 that is configured to couple detachably with each other. The inner surfaces of upper half-shell 411 and lower half-shell 412 may be configured to hold a bait attractant material, and chamber 410 is configured to release the volatile compounds of said attractant though vents 430-435. Surface topographies 420 and 421 may be in the form of horizontal groove. Chamber 410 may be in the form of a cylinder that has a length that is parallel to the axis of the intersection of upper half-shell 411 and lower half-shell 412. Chamber 410 is configured to disassemble along the length of the upper half-shell 411 and lower half-shell 412.

In one or more embodiments of the invention, upper half-shell 411 and lower half-shell 412 may open up to expose the inner surfaces for cleaning, repair, and inspection. In one or more embodiments of the invention, the area where the upper chamber and the lower chamber meet effectively forms a hinge so that the upper and chambers automatically align when the chamber 410 is closed. In one or more embodiments of the invention, the upper and lower sections of chamber 410 may close through any means for detachably coupling the two sections including pins and blind-holes, tongue and grooves, hinges, tape, or mechanical fasteners for example.

In one or more embodiments, chamber 410 may be made out of a semi-flexible plastic such as polyethylene, polypropylene, nylon, flexible PVC, or out of rubber. Any type of flexible material is in keeping in spirit with the spirit of the invention. In one or more embodiments of the invention, chamber 410 may be formed through an injection molding process, through a stamping process, through a machining or milling process, or through a melting or fastening process.

In one or more embodiments of the invention, vents 430-435 may be formed to allow the volatile compounds of the bait attractant to escape to the surrounding environment. A plurality of grooves 420 and 421 may be formed on chamber 410 to encourage navel orangeworm to lay their eggs on these grooves. Hanger 470 is coupled to chamber 410 to enable chamber 410 to be hung from tree branches.

Figure 5:
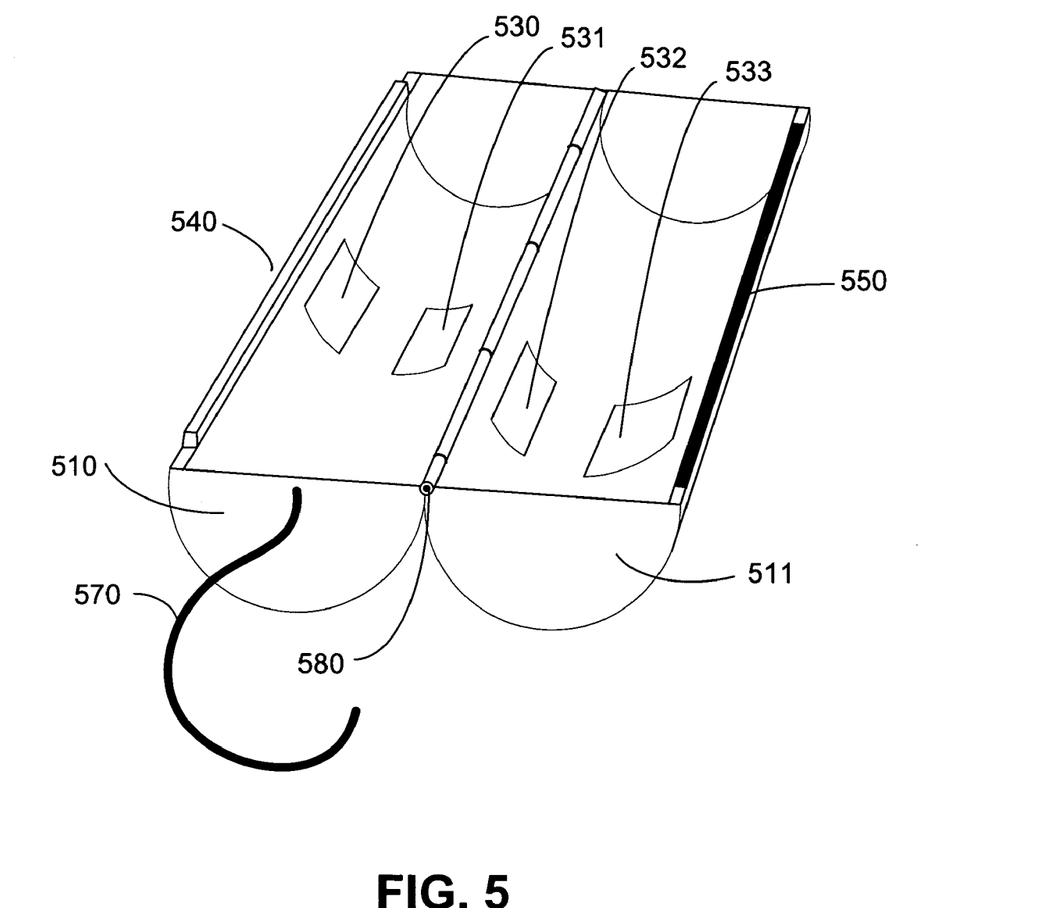
FIG. 5 presents one or more embodiments of the invention that has a tongue and groove structure to detachably couple the chamber sections.

FIG. 5 presents one or more embodiments of the invention that may have a tongue 540 and groove 550 as the means for detachably coupling chamber section 510 to chamber section 511. In one or more embodiments of the invention, a bait attractant may be placed within the inner volume of chamber section 510 and chamber section 511. In one or more embodiments of the invention, the tongue 540 and groove 550 may be formed through an injection molding process, or through a milling or machining process. Chamber section 510 may rotate about hinge 580 so that the tongue 540 is automatically aligned with groove 550. Vents 530-533 may allow the bait attractant to permeate the surrounding environment. Hanger 570 enables one or more embodiments of the invention to be hung from tree branches or other physical structures.

Figure 6A:
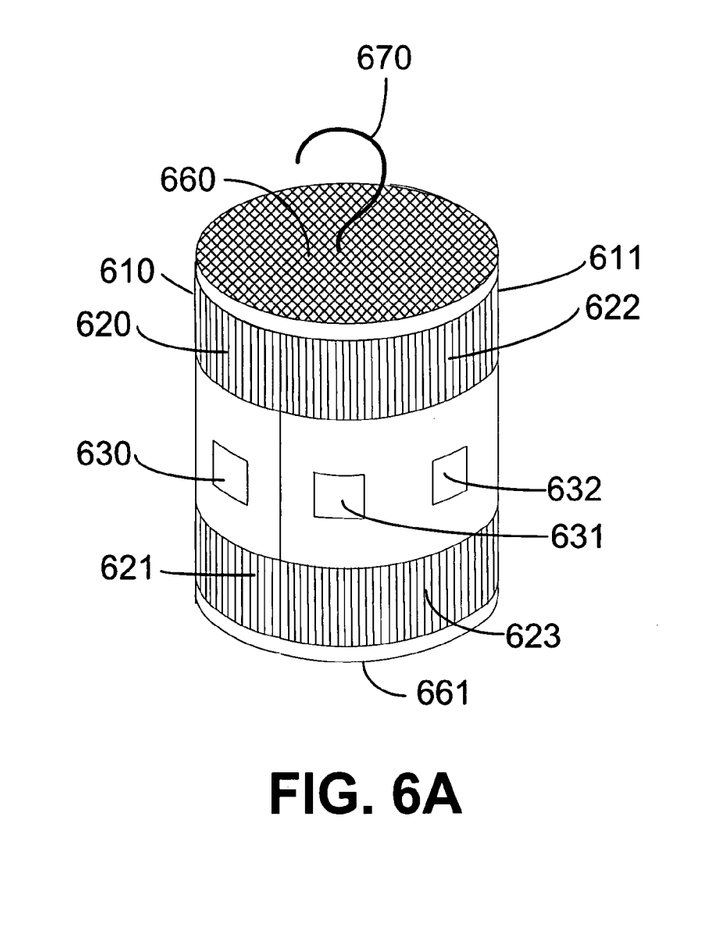
FIGS. 6A and 6B present one or more embodiments in which the chamber sections are marked with surface features.
Figure 6B:
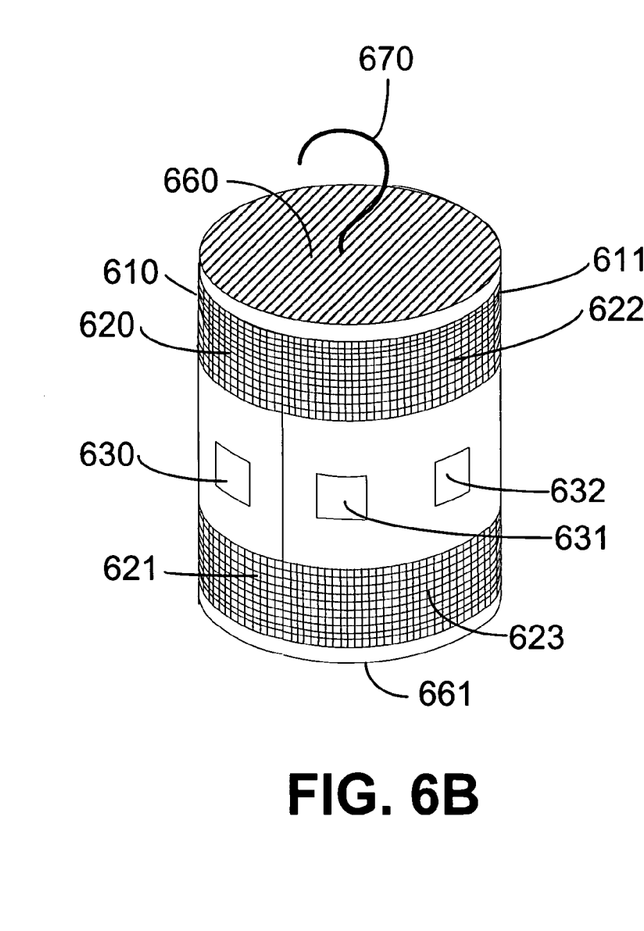

FIGS. 6A and 6B present one or more embodiments in which the chamber sections 610 and 610 may be marked with surface features 620 and 621, and 622 and 623 respectively. FIG. 6A presents one or more embodiments in which the surfaces 620-623 may have grooves or ridges in a vertical or nearly vertical orientation. FIG. 6A presents one or more embodiments of the invention in which the outer surfaces of other the top and or bottom end-cap may be marked with a cross-hatch of grooves or ridges. FIG. 6B presents one or more embodiments of the invention in which the surfaces 620-623 are marked with a cross-hatch pattern of grooves or ridges. FIG. 6B presents an embodiment of the invention in which the top and or bottom end-cap 660 and 661 respectively are marked with a plurality of grooves or ridges. Any combination or orientation of grooves, ridges, cross-hatch patterns, or any other two dimensional surface topography that will simulate the splitting of a nutshell or is otherwise attractive to a female navel orangeworm is in keeping with the spirit of the invention. In one or more embodiments of the invention, the grooves may be formed through an injection molding process, through a machining or milling process, through an etching process, through an engraving process, or through any process that results in a series of grooves on the surface. Vents 630-632 allow the volatile compounds of the bait attractant to permeate the surrounding environment, which lures female orangeworms to lay their eggs on the surface topography. Hanger 670 enables one or more embodiments of the invention to be hung from a tree branch or other physical structure.

While the invention herein disclosed has been described by means of specific embodiments and applications thereof, numerous modifications and variations could be made thereto by those skilled in the art without departing from the scope of the invention set forth in the claims.

What is claimed is:

1. An egg trap apparatus comprising:
   a plurality of chamber sections configured to detachably couple vertically along one or more vertical edges to form a chamber, wherein each of said plurality of chamber sections comprises:
      a first vertical edge configured to couple with a second adjacent vertical edge of an adjacent chamber section to said first vertical edge;
      a second vertical edge configured to couple with a first adjacent vertical edge of an adjacent chamber section to said second vertical edge;
      an exterior surface forming a portion of an exterior of said chamber;
      an interior surface forming a portion of an interior of said chamber;
      at least one row of a plurality of vents, wherein said plurality of vents are contiguous and wherein said plurality of vents run from said first vertical edge to said second vertical edge;
      an upper surface topography comprising a first plurality of grooves formed on said exterior surface positioned above said at least one row of said plurality of vents;
      a lower surface topography comprising a second plurality of grooves formed on said exterior surface positioned below said at least one row of said plurality of vents; and
      a meshed screening material secured to said interior surface across said at least one row of said plurality of vents, wherein said meshed screening material prevents an ovipositional bait attractant placed within said interior of said chamber from leaking out of said interior, prevents an insect or animal from reaching said ovipositional bait attractant, and allows volatile compounds of said ovipositional bait attractant to escape said chamber through said plurality of vents;
   a top end-cap configured to seal a top end of said chamber, wherein said top end-cap is further configured to receive a hanger configured to support said chamber from a physical structure; and
   a bottom end-cap configured to seal a bottom end of said chamber.

2. The trap apparatus of claim 1, wherein said hanger and said top end-cap are formed as a one-piece assembly.

3. The trap apparatus of claim 1, wherein an exterior color of said chamber is dark.

4. The trap apparatus of claim 1, wherein at least one exterior surface of at least one of said top end-cap and said bottom end-cap further comprises end-cap surface topographies.

5. The trap apparatus of claim 1, wherein said plurality of chamber sections are configured to couple detachably with at least one hinge.

6. The trap apparatus of claim 1, wherein said plurality of chamber sections are configured to couple detachably with at least one tongue and at least one groove on said plurality of chamber sections.

7. The trap apparatus of claim 1, wherein said at least one of said first plurality of grooves and said second plurality of grooves comprises vertical grooves configured to simulate an egg laying surface.

8. The trap apparatus of claim 1, wherein said at least one of said first plurality of grooves and said second plurality of grooves comprises a cross-hatch pattern configured to simulate an egg laying surface.

9. The trap apparatus of claim 1, wherein said at least one of said first plurality of grooves and said second plurality of grooves comprises horizontal grooves configured to simulate an egg laying surface.

10. The trap apparatus of claim 1, comprising two chamber sections, wherein said chamber formed from said two chamber sections is cylindrical.

11. An egg trap apparatus comprising:
a plurality of chamber sections configured to detachably couple vertically along one or more vertical edges to form a chamber, wherein each of said plurality of chamber sections comprises:
a first vertical edge configured to couple with a second adjacent vertical edge of an adjacent chamber section to said first vertical edge;
a second vertical edge configured to couple with a first adjacent vertical edge of an adjacent chamber section to said second vertical edge;
an exterior surface forming a portion of an exterior of said chamber;
an interior surface forming a portion of an interior of said chamber;
a top side configured to couple with other top sides of said plurality of chamber sections to form a sealed top of said chamber;
a bottom side configured to couple with other bottom sides of said plurality of chamber sections to form a sealed bottom of said chamber;
at least one row of a plurality of vents, wherein said plurality of vents are contiguous and wherein said plurality of vents run from said first vertical edge to said second vertical edge;
an upper surface topography comprising a first plurality of grooves formed on said exterior surface positioned above said at least one row of said plurality of vents;
a lower surface topography comprising a second plurality of grooves formed on said exterior surface positioned below said at least one row of said plurality of vents; and
a meshed screening material secured to said interior surface across said at least one row of said plurality of vents, wherein said meshed screening material prevents an ovipositional bait attractant placed within said interior of said chamber from leaking out of said interior, prevents an insect or animal from reaching said ovipositional bait attractant, and allows volatile compounds of said ovipositional bait attractant to escape said chamber through said plurality of vents.

12. The trap apparatus of claim 11, wherein said sealed top of said chamber is further configured to receive a hanger configured to support said chamber from a physical structure.

13. The trap apparatus of claim 11, wherein an exterior color of said chamber is dark.

14. The trap apparatus of claim 11, wherein at least one exterior surface of at least one of said top end-cap and said bottom end-cap further comprises end-cap surface topographies.

15. The trap apparatus of claim 11, wherein said plurality of chamber sections are configured to couple detachably with at least one hinge.

16. The trap apparatus of claim 11, wherein said plurality of chamber sections are configured to couple detachably with at least one tongue and at least one groove on said plurality of chamber sections.

17. The trap apparatus of claim 11, wherein said at least one of said first plurality of grooves and said second plurality of grooves comprises vertical grooves configured to simulate an egg laying surface.

18. The trap apparatus of claim 11, wherein said at least one of said first plurality of grooves and said second plurality of grooves comprises a cross-hatch pattern configured to simulate an egg laying surface.

19. The trap apparatus of claim 11, wherein said at least one of said first plurality of grooves and said second plurality of grooves comprises horizontal grooves configured to simulate an egg laying surface.

20. The trap apparatus of claim 11, comprising two chamber sections, wherein said chamber formed from said two chamber sections is cylindrical.

* * * * *